April 24, 1962     E. J. KNAPTON     3,030,726
FISHLINE SINKER ASSEMBLAGE
Filed May 26, 1959
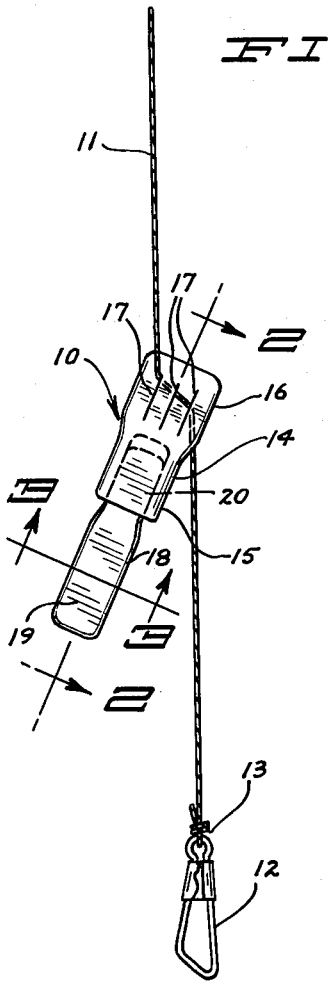
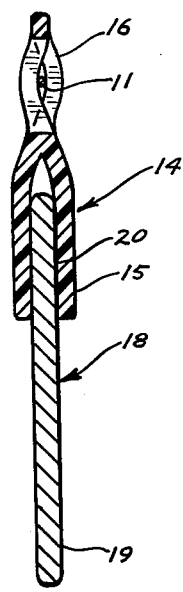
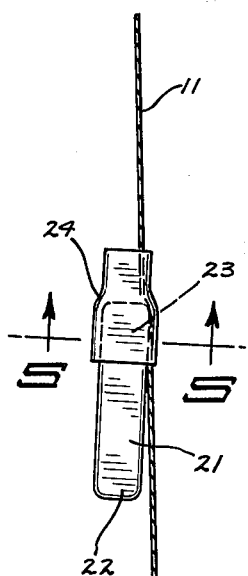
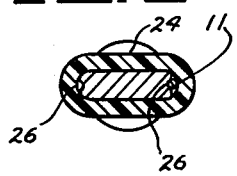
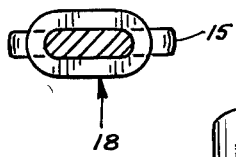
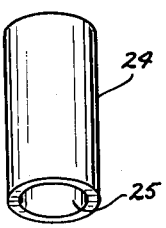
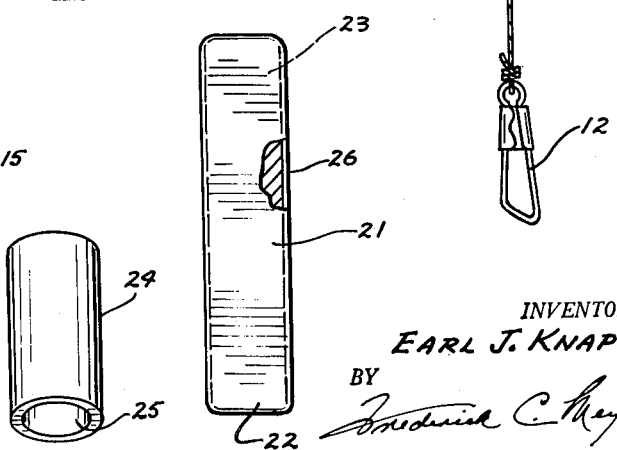
INVENTOR.
EARL J. KNAPTON
BY
ATTORNEY

United States Patent Office 3,030,726
Patented Apr. 24, 1962

3,030,726
FISHLINE SINKER ASSEMBLAGE
Earl J. Knapton, 508 S. 2nd St., Bemidji, Minn.
Filed May 26, 1959, Ser. No. 815,961
2 Claims. (Cl. 43—44.93)

This invention relates to fishing accessories, and more particularly to a sinker assemblage for use with fishline.

It is an important object of the present invention to provide a cheap and efficient sinker assemblage which can be readily attached and detached to fishlines at any desired location therealong.

Another object of the invention is to provide a two-piece sinker having a holder portion which can be slid to a multiplicity of locations on a fishline without separating therefrom, and a weight portion which can be mounted and interchanged with other weight portions according to the desired weight of the assemblage.

A further object of the invention is to provide a device of the class described wherein the holder portion is tubular and is resilient such that it may be deformed to pass over a leader snap-hook but, if accidentally dropped or released while on a fishline, will merely slide the length of the unspooled line and become caught by the swivel hook and thereby prevented from being separated from the fishline and lost in the water.

These and other objects and advantages of any invention will more fully appear from the following description, made in connection with the accompanying drawing, wherein like reference character refer to the same parts throughout the several views and in which:

FIGURE 1 shows my fishline sinker assemblage threaded for use upon a segment of the fishline;

FIGURE 2 is an enlarged longitudinal section taken on the line 2—2 of FIGURE 1;

FIGURE 3 is an enlarged cross section taken on the line 3—3 of FIGURE 1;

FIGURE 4 is an alternate form of the invention wherein the sinker assemblage is secured in a different manner to a fishline;

FIGURE 5 is an enlarged cross section taken on the line 5—5 of FIGURE 4;

FIGURE 6 is an enlarged view of the weight member utilized in the alternate form of the invention, a portion thereof being cut away to better show the groove construction;

FIGURE 7 is a perspective view of the resilient tubular holder utilized in the alternate form of the invention.

With continued reference to the drawing, and particularly to FIG. 1, my sinker assemblage is designated generally at 10 and is adapted to be secured frictionally to a fishline 11 terminating in a snaphook 12 which is secured to the fishline 11 by means of a knot 13. The sinker assemblage 10 in turn has a resilient holder 14 which is adapted to be threaded upon the fishline 11 and to be frictionally adjustable therealong. The resilient holder 14 has a hollow portion 15 and a solid portion 16 in which a plurality of slits 17 are formed as shown. The slits 17 may be cut in spaced parallel relation through the solid portion 16 and are of such length as will permit the snaphook 12 to be threaded therethrough with slight deformation of the resilient holder 14. Holder 14 may be made from plasticized material which is somewhat resilient in nature but is stiff enough to provide the requisite friction when the fishline 11 is threaded through the slits 17. When mounting the resilient holder 14 upon fishline 11, the snaphook 12 is passed downwardly through one of the slits 17 and alternately up and down through the remaining slits. The staggered position of the fishline 11 will cause a natural frictional drag on the holder 14 which will cause it to remain in any position on the fishline 11 to which it may be moved. It is, of course, understood that the holder 14 can be forcibly adjusted to any desired location by merely tensioning the fishline 11 and sliding the holder against the frictional securement through the slits 17.

The outer extension of the resilient holder constitutes the hollow portion 15 which may be tubular in character. This hollow portion 15 is stiff but may be distorted resiliently to accomplish the purposes of this invention.

A weight element 18 has a finger-grasping portion 19 and an insert portion 20 which may be tapered so as to be of slightly lesser width than the finger-grasping portion 19. The weight element 18 may be constructed of lead or other material having the desired density and may be of different sizes and weights to provide the desired sinking characteristics of line 11 in use under water.

During use, the resilient holder 14 is mounted upon fishline 11 in the manner previously described so that the solid portion 16 is distorted and exerts frictional influence upon the fishline 11, as shown in FIG. 2. The resilient holder 14 can then be forcibly positioned at any desired location on fishline 11, following which a weight element 18 of the desired size and weight is selected for attachment. The insert portion 20 is of a width which will resiliently distort the tubular portion 15 of the resilient holder 14 and be frictionally retained therein. The finger-grasping portion 19 is wider than the insert portion 20 and is adapted to extend outwardly therefrom during use, as shown in FIGS. 1 and 2. The portion 19 can be of various sizes and shapes so as to provide a plurality of different weights to be applied to the resilient holder 14. Thus, without removing the holder 14 from the fishline 11, a weight element 18 may be selected which will cause the fishline 11 and a given lure on snaphook 12 to assume a certain depth when trolling for fish. Replacing the weight element 18 with another having a smaller finger-grasping portion 19 will cause the line and lure to troll at a shallower depth. On the other hand, if a larger weight element is selected wherein the finger-grasping portion 19 extends farther outwardly and has a greater mass of material, then the fishline 11 and its lure will be caused to ride at a lower depth. The sinker assemblage 10 thus provides means for rapidly locating a sinker of desired weight at any desired location on fishline 11. Even the attachment of the resilient holder portion 14 does not necessitate removal of the snaphook 12 from fishline 11.

Referring now to FIGS. 4–7, I show an alternate form of the invention which permits adjustment of the sinker assemblage at any position along line 11, and the insertion of an appropriate weight element 21 which is constructed of similar material to the previously described element 18 and also has a finger-grasping portion 22 and an insert portion 23, as shown in FIG. 4. The alternate form of the invention, however, employs a simple resilient holder 24 which is tubular in character and having an opening 25 of a diameter which is slightly less than the width of the snaphook 12. Thus, the resilient holder 24 can be flattened so as to pass over the snaphook 12 and freely ride on the fishline 11, as shown in FIG. 4. In the alternate form, the resilient holder does not become frictionally engaged with fishline 11 until the weight element 21 is inserted into the opening or bore 25. The weight element 21 which is used with the alternate form has the finger-grasping portion 22 and the insert portion 23, as described, and is also provided with line-receiving grooves 26 at each side of the weight element, as shown in FIGS. 5 and 6.

In use, the resilient holder 24 is flattened so as to pass over the snaphook 12 and then is brought to the proper location on fishline 11 as shown in FIG. 4. The weight element 21 is then selected for the proper size and weight and the insert portion 23 is forced into the opening 25 of the resilient holder 24. A groove 26 is formed at each edge of the weight element 21 as shown in FIGS. 5 and 6, and this groove is adapted to partially receive the line 11 when the weight element is inserted into the resilient holder 24, as shown in FIG. 5. The weight element 21 is thus frictionally retained in contact with the opening 25 of the resilient holder 24 and, at the same time, binds the line 11 in pinched relation between the weight element 21 and the resilient holder 24. Should the weight element 21 be accidentally pulled from the resilient holder 24, or should the line 11 be accidentally dropped into the water prior to its insertion of a weight element 21, the resilient holder 24 will merely slide downwardly until it engages the snaphook 11. Since the natural diameter of the opening 25 is less than the width of the snaphook 12, the resilient holder will remain in abutted relation therewith and not be lost. However, if it be desired to deliberately remove the resilient holder 24, then it may be deformed as previously described and passed over the snaphook 12.

It will be observed that in either of the forms of my invention a single resilient holder and several weight elements will give complete versatility both as to the amount of weight and the positioning of the sinker assemblage with a minimum of time and effort.

It will, of course, be understood that various changes may be made in the form, details, arrangements and proportions of the parts without departing from the scope of my invention as set forth in the appended claims.

What I claim is:

1. A sinker assemblage comprising, a length of fishline, a snaphook secured to said fishline, a resilient tubular holder having an internal diameter less than the widest dimension of said snaphook and adapted to be deformed to pass over said snaphook, and a weight element having a finger-grasping portion and an insert portion, said insert portion being adapted to be inserted within said resilient tubular holder to deform the same and be frictionally engaged therein whereby to hold the assemblage at a predetermined location on said fishline and to supply the requisite amount of weight at said location.

2. A sinker assemblage comprising, a length of fishline, a snaphook secured to said fishline, a resilient holder having a weight receiving opening formed therein, said fishline being threadedly passed through said holder and normally stopping passage of said snaphook but distortable to permit intentional passage thereof, and a weight element having a finger-grasping portion and an insert portion, said insert portion being adapted to be inserted within said weight receiving opening to deform the same and be frictionally engaged therein whereby said sinker assemblage may be retained at a predetermined location on said fishline and to supply the requisite amount of weight at said location.

References Cited in the file of this patent
UNITED STATES PATENTS 2,814,903    Banowetz _____ Dec. 3, 1957
2,834,143    Bibeau _____ May 13, 1958